(12) United States Patent
Chien

(10) Patent No.: US 11,098,863 B2
(45) Date of Patent: *Aug. 24, 2021

(54) MULTIPLE FUNCTIONS LED NIGHT LIGHT

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,762

(22) Filed: Jan. 8, 2019

(65) Prior Publication Data

US 2020/0217465 A1    Jul. 9, 2020

Related U.S. Application Data

(63) Continuation of application No. 14/739,397, filed on Jun. 15, 2015, now Pat. No. 10,184,624, and a
(Continued)

(51) Int. Cl.

| | |
|---|---|
| *F21S 8/00* | (2006.01) |
| *F21S 9/02* | (2006.01) |
| *F21V 29/00* | (2015.01) |
| *F21V 33/00* | (2006.01) |
| *F21V 23/04* | (2006.01) |

(Continued)

(52) U.S. Cl.
CPC ............... *F21S 8/035* (2013.01); *F21S 9/022* (2013.01); *F21S 10/002* (2013.01); *F21V 23/045* (2013.01); *F21V 23/0435* (2013.01); *F21V 23/0442* (2013.01); *F21V 23/0457* (2013.01); *F21V 23/0464* (2013.01); *F21V 23/0478* (2013.01); *F21V 27/00* (2013.01); *F21V 29/00* (2013.01); *F21V 33/0004* (2013.01); *F21V 33/0052* (2013.01); *F21V 33/0056* (2013.01); *F21K 9/235* (2016.08); *F21V 9/08* (2013.01); *F21W 2121/00* (2013.01); *F21Y 2101/00* (2013.01); *F21Y 2115/10* (2016.08)

(58) Field of Classification Search
CPC ............. F21S 8/035; F21K 9/23; F21K 9/232
See application file for complete search history.

(56) References Cited

U.S. PATENT DOCUMENTS 2,480,393 A    8/1949  Bossert et al.
3,974,495 A    8/1976  Jones
(Continued)

*Primary Examiner* — William N Harris
(74) *Attorney, Agent, or Firm* — Bacon & Thomas, PLLC

(57) ABSTRACT

The Multiple functions LED nigh light not only offer LED illumination under predetermined colors, functions, effects including at least one of color-changing, color selection, functions selection with preferred switch, sensor, PIR sensor, radar sensor, rechargeable battery, power fail light, USB charging or be-charged system, outlets, audio device, surge/over heat/over charge/short-circuit protection, function selection between motion or non-motion or dust-to-dawn, or other preferred additional-functions list inside text below. The said multiple functions not only offer LED illumination but also offer at least one of additional-functions such As LED motion sensor night light have color-changing, color-selection, functions selection and the said additional-functions including power fail light and/or USB-charger or other preferred additional-functions such as outlets, or camera with wifi incorporate with download APP for wireless or remote control, adjustment, setting to offer people safety and multiple functions.

29 Claims, 3 Drawing Sheets

Related U.S. Application Data continuation of application No. 14/739,666, filed on Jun. 15, 2015, now Pat. No. 10,487,999, which is a continuation of application No. 11/806,285, filed on May 31, 2007, application No. 16/242,762, which is a continuation of application No. 11/806,284, filed on May 31, 2007, now Pat. No. 7,632,004, said application No. 14/739,397 is a continuation of application No. 11/806,285, filed on May 31, 2007, application No. 16/242,762, which is a continuation-in-part of application No. 11/498,874, filed on Aug. 4, 2006, which is a continuation of application No. 10/954,189, filed on Oct. 1, 2004, now abandoned.

(51) Int. Cl.

| | |
|---|---|
| *F21V 27/00* | (2006.01) |
| *F21Y 115/10* | (2016.01) |
| *F21K 9/235* | (2016.01) |
| *F21V 9/08* | (2018.01) |
| *F21W 121/00* | (2006.01) |
| *F21Y 101/00* | (2016.01) |
| *F21S 10/00* | (2006.01) |

(56) References Cited

U.S. PATENT DOCUMENTS

| | | | |
|---|---|---|---|
| 4,701,038 A | 10/1987 | Neefe | |
| 4,729,069 A | 3/1988 | Von Kohorn | |
| 4,816,973 A | 3/1989 | Atalla et al. | |
| 5,465,198 A * | 11/1995 | Kellogg | F21V 25/04 362/253 |
| 5,924,784 A | 7/1999 | Chliwnyj et al. | |
| 6,000,807 A * | 12/1999 | Moreland | H01H 9/18 307/66 |
| 6,132,057 A | 10/2000 | Williams | |
| 6,220,722 B1 | 4/2001 | Begemann | |
| 6,431,719 B1 * | 8/2002 | Lau | F21V 23/0442 362/95 |
| 6,478,440 B1 | 11/2002 | Jaworski | |
| 6,499,853 B2 | 12/2002 | Stekelenburg | |
| 6,499,860 B2 | 12/2002 | Begemann | |
| 6,577,073 B2 | 6/2003 | Shimizu et al. | |
| 6,648,496 B1 | 11/2003 | Elghoroury et al. | |
| 6,709,126 B1 | 3/2004 | Leen | |
| 6,762,562 B2 | 7/2004 | Leong | |
| 6,762,563 B2 | 7/2004 | St.-Germain et al. | |
| 6,762,583 B2 * | 7/2004 | Ho | H02J 7/0042 320/107 |
| 6,905,231 B2 | 6/2005 | Dickie | |
| 6,911,915 B2 | 6/2005 | Wu et al. | |
| 6,926,426 B2 | 8/2005 | Currie et al. | |
| 6,953,264 B2 | 10/2005 | Ter-Hovhannisian | |
| 6,964,498 B2 | 11/2005 | Wu | |
| 7,006,002 B2 * | 2/2006 | Shomali | F21L 4/08 340/539.1 |
| 7,036,948 B1 * | 5/2006 | Wyatt | H01R 13/6683 362/276 |
| 7,045,975 B2 | 5/2006 | Evans | |
| 7,145,179 B2 | 12/2006 | Petroski | |
| 7,524,089 B2 | 4/2009 | Park | |
| 7,932,482 B2 | 4/2011 | Norwood | |
| 8,215,820 B2 * | 7/2012 | Howard | F21S 8/035 362/641 |
| 2003/0185020 A1 | 10/2003 | Stekelenburg | |
| 2004/0246704 A1 | 12/2004 | Burdick | |
| 2005/0185402 A1 * | 8/2005 | Hsu | G02B 6/0008 362/257 |
| 2005/0201081 A1 * | 9/2005 | Brady | F21S 10/002 362/101 |
| 2006/0002153 A1 * | 1/2006 | Currie | F21S 8/035 362/641 |
| 2006/0007709 A1 * | 1/2006 | Yuen | F21S 8/035 362/641 |
| 2006/0062019 A1 * | 3/2006 | Young | F21S 8/035 362/641 |
| 2006/0072346 A1 * | 4/2006 | Chien | F21V 23/06 362/641 |
| 2006/0146527 A1 | 7/2006 | Vanderschuit | |
| 2006/0164823 A1 * | 7/2006 | Jao | B44C 5/005 362/101 |
| 2008/0233780 A1 * | 9/2008 | Waters | H01R 13/7172 439/214 |
| 2011/0110118 A1 * | 5/2011 | Hsiao | F21V 33/0004 362/643 |
| 2013/0176738 A1 * | 7/2013 | Tinaphong | F21V 23/0464 362/253 |
| 2013/0265743 A1 * | 10/2013 | Lee | A61L 9/044 362/96 |
| 2014/0185325 A1 * | 7/2014 | Howard | F21S 8/035 362/641 |

\* cited by examiner

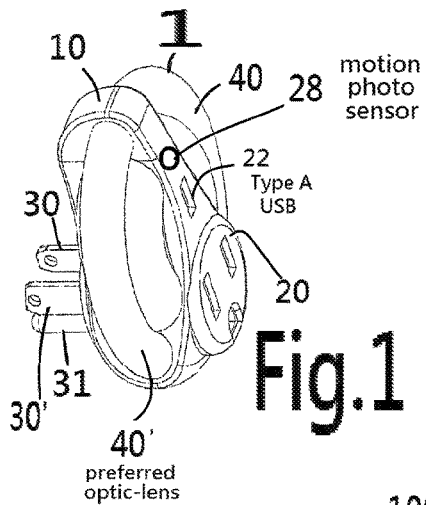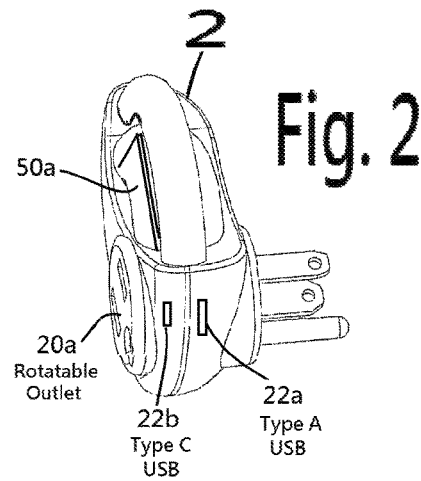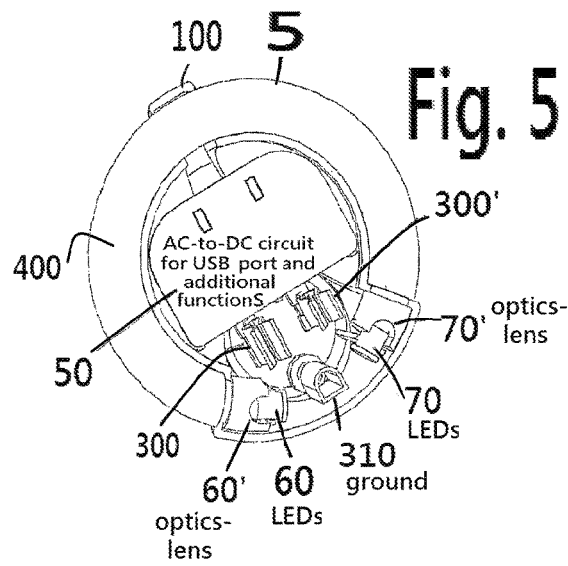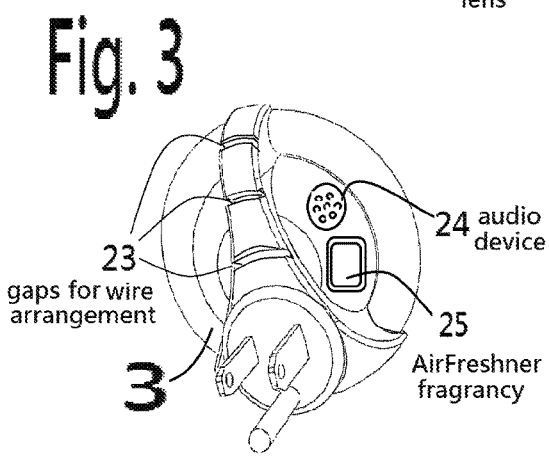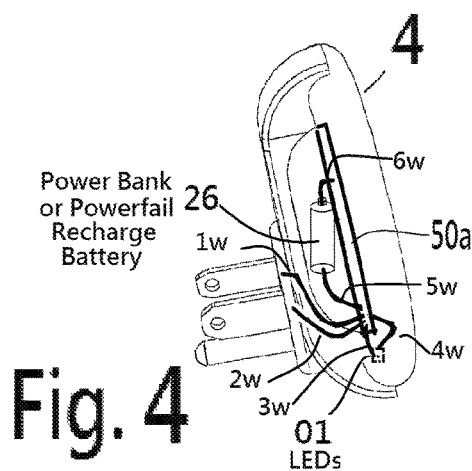

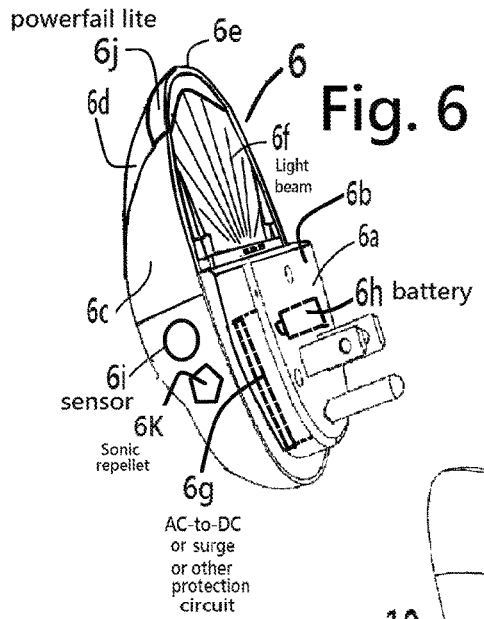
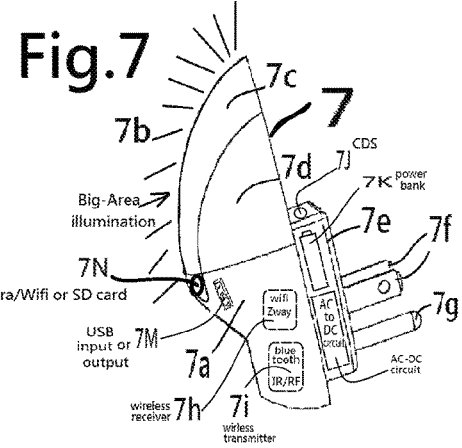
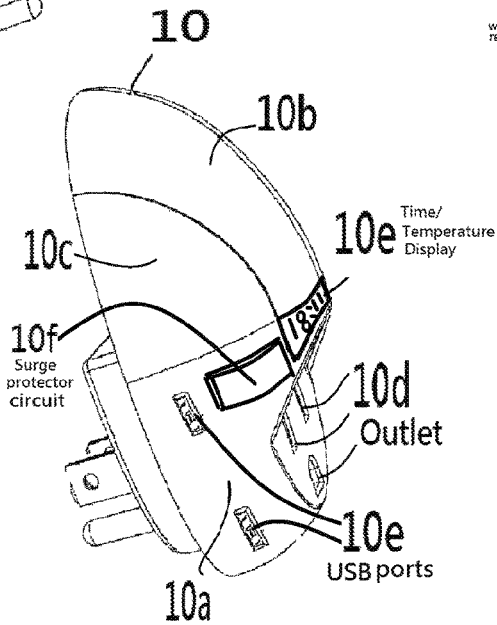
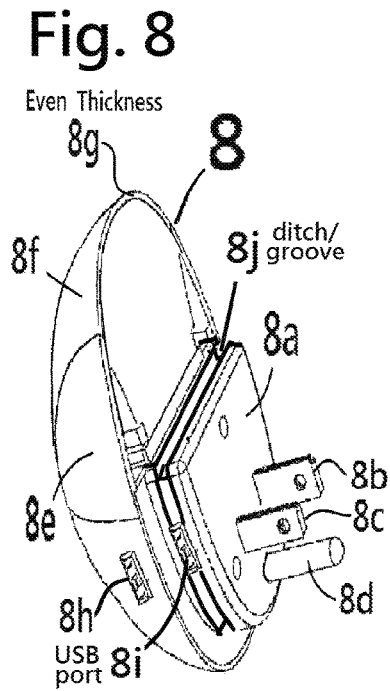
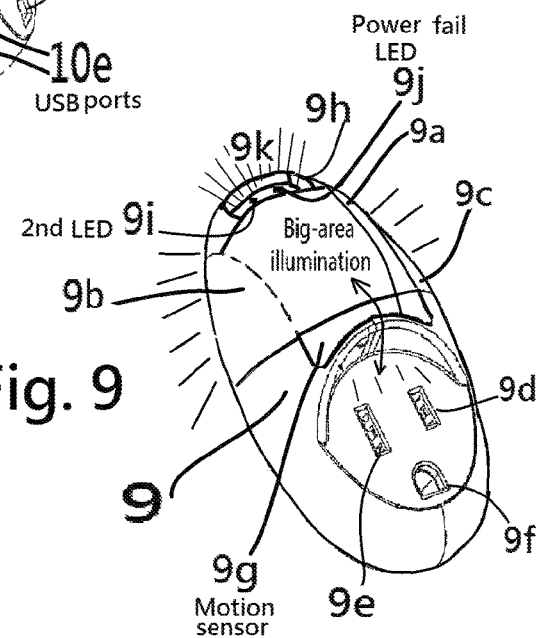

Different with Prior-Art
6,227,679 5/8-2001

Bug Repellor Device
or
2nd function Device

MULTIPLE FUNCTIONS LED NIGHT LIGHT

FILING HISTORY

This application is a continuation of (#R-3)
U.S. patent application Ser. No. 14/739,499, filed Jun. 16, 2015,
This application is a continuation of (#R-2)
U.S. patent application Ser. No. 14/739,666, filed Jun. 15, 2015,
This application is a continuation of (#R-1)
U.S. patent application Ser. No. 14/739,397, filed Jun. 18, 2015, now is allowance on Nov. 21, 2018
This application is a continuation of (#R-07)
U.S. patent application Ser. No. 11/806,285, filed May 31, 2007,
This application is a continuation of (#Q-07)
U.S. patent application Ser. No. 11/806,284, filed May 31, 2007,
This application is a continuation of (#K-06)
U.S. application Ser. No. 11/498,874 filed on Aug. 4, 2006
This application is a continuation of
U.S. application Ser. No. 10/954,189 filed on Oct. 1, 2004.
This application is a continuation of (M-06)
U.S. patent application Ser. No. 11/527,628, filed Sep. 27, 2006, now is U.S. Pat. No. 7,611,253 issue on Nov. 3, 2009,
This application is a continuation of (I-06)
U.S. patent application Ser. No. 11/498,881, filed Aug. 4, 2006, now is U.S. Pat. No. 7,568,829 issue on Aug. 4, 2009,
This application is a continuation of (#L)
U.S. patent application Ser. No. 11/527,629, filed 9-27-200, now is U.S. Pat. No. 8,545,090 issue on Oct. 1, 2013,
This application is a continuation of (#H-1)
U.S. patent application Ser. No. 12/546,012, filed 2009, now is U.S. Pat. No. 8,029,182 issue on Oct. 4, 2011
which is (#E-05) CIP of U.S. application Ser. No. 11/094,215 filed on Mar. 31, 2005 now is U.S. Pat. No. 7,909,477 issue on Mar. 22, 2011,
This application is a continuation of (#H-05)
U.S. patent application Ser. No. 11/255,981, filed Oct. 24, 2005,
and herein incorporated by reference.

BACKGROUND

The following co-pending U.S. patent applications by the same Inventor also are directed to night lights: Ser. No. 10/883,747, filed Jul. 6, 2004; Ser. Nos. 11/092,741; 11/094,215; 11/255,981; 11/498,881; 11/527,631; 11/498,874; 11/527,629; and 11/527,628.

In addition, the Inventor's U.S. Pat. Nos. 5,926,440; 6,158,868; 6,170,958; 6,171,117; 6,280,053 disclose arrangements of conductive for night lights and multiple function night lights incorporated time pieces. Other U.S. Pat. Nos. 4,947,291; 5,495,402; 5,662,408; 5,713,655; 5,803,579; 5,816,682; 5,833,350; 5,893,626; 5,998,928; 6,000,807; 6,010,228; 6,031,958; 6,033,087; 6,056,420; 6,132,072; 6,160,948; 6,161,910; 6,183,101; 6,190,017; 6,290,368; 6,337,946; 6,386,730; 6,390,647; 6,00,104; 6,411,524; 6,431,719; 6,509,832; 6,523,976; 6,550,949; 6,609,812; 6,623,416; 6,641,289; 6,648,496; and 6,709,126 all show different light sources and applications but none teaches an LED night light having multiple functions which may be selected from the group including an adaptor device, fan device, heat device, bug repelled device, sonic device, frequency device, or any other home electric appliance or device suitable for adding onto an LED night light.

The current invention offers a big improvement in power saving because it incorporates the low power consumption Light Emitting Diode (LED) to replace the incandescent bulb which normally uses a 4 Watt or 7 Watt or more power consumption light. A single LED normally has a 0.3 Watt+/−100% power consumption depending on the product design with desire number of additional-functions and illumination needed.

The current invention not only provides a power saving LED light-source device but also reduces a consumer's monthly electricity expense. The current invention also supplies two or more practical additional-functions to the consumer. The said practical additional-functions preferred embodiment may select from, for example, an air-freshener and/or (as described in co-pending U.S. patent application Ser. Nos. 11/527,631; 11/527,629; 11/498,881; 11/498,874; and 11/527,628; etc.) an adaptor/receiving/USB/Outlet device, sonic/IR/RF remote control device, frequency/bluetooth/Z-way/Zig-Bee/wife/internet/download APP/or other wireless device, bug repelled device, second LED applications or light device, timepiece, electric message device, timer device, temperature device, surge protection device, electric short circuit protection device, base device for installation on an existing lamp socket has AC wired or prong, emergency/power fail light device with recharge or regular battery for backup power, or any other electric device(s) used in a home to keep people comfortable or safe.

This current invention optionally may further incorporate the teachings of the co-pending application entitled
"U.S. Pat. No. 7,455,444, issued date on Nov. 25, 2008 which is U.S. application Ser. No. 11/255,981 filed on Oct. 24, 2005 Publication Ser. No. 2006/0152 946 Publication date on Jul. 13, 2006 for (#H-05) LED night light with more than one LED light source" concerning the LED night light have more than one LED light-source(s), and
"U.S. Pat. No. 7,632,004 issued date on Dec. 15, 2009 which is U.S. application Ser. No. 11/806,284 filed on May 31, 2007 Publication Ser. No. 2008/0304 289 Publication date on Dec. 11, 2008 for (#Q-07) LED night light with more than one optics means" concerning the inclusion in the LED night light of an optical element that improves the visibility of light beams from the LED. Both co-inventor patent cases all issue date is later than current invention parent filed date on 2007 as above filing history.

All existing LED nightlights have the big problem that the LED unit can be seen by a viewer over a narrow viewing angle only, and that the brightness over that angle is too strong, resulting in spot-light effects (super bright in a small area). The co-pending application (#Q-07) teaches multiple (more than one) optics to provide a big illumination-area [FIG. 9 (9a)] and a big improvement from spot-light to linear or big-area in geometric-shape brightness, thereby causing the spot-light effects to change to a nice looking lighting effect such as [FIG. 9 (9a)] that provided by a LED light in preferred arrangement. It is very difficult to use only one piece of optics-piece or optics-lens to cause the strong spot-light LED unit(s) to have nice and warm light with even-brightness for big-area effects [FIG. 9 (9a)] that can be seen by a viewer.

This is a big improvement in the LED night light.

The current invention further adds preferred some other arrangement such as reflector(s), bubble(s), or lens(es) within any of the optics or fit within the said LED night light to increase the effects of modifying the narrow viewing angle light beams emitted out of the LED(s) to provide linear or area light effects.

Furthermore, the current LED night light invention solves several problems with the most night light in the market place. The most night light total length is around 88 mm+/−50 mm (with base), The only lens height is around 60 mm+/−30 mm (without base). The height from the wall outlet cover is around 35 mm+/−15 mm (from outlet cover surface). If the LED unit is placed on the same location as the outlet cover surface, the distance from the wall to the outside lens will be less than 35 mm+/−15 mm, which is too short to make the spot-light LED's into a surface or area photometric or lighted area. The problem is solved by using two optics to get a good surface or area lighting effect or by put at least one LED(s) on bottom or top or sides for illumination-area inner surfaces to increase the LED light-travel distance with or without inner optics reflective, diffusor, refractive piece(s) to help light traveled, reflected, refracted for multiple times to make the LED light-source spot light become even area-illumination. This concept is same as co-pending filed case (#K-07) U.S. application Ser. No. 11/498,874 filed on Aug. 4, 2006 Publication number US 2007/007-6437 publication date on Apr. 5, 2007 which is CIP of U.S. application Ser. No. 10/954,189 filed on Oct. 1, 2004. In addition, the LED night light power consumption will fall within the 0.3 W+/−100% per LED range, whereas the power consumption of a bulb night light falls within 4 Watt+/−50% per bulb. So the LED night light will have a big power saving and reduce the monthly electric bill for the consumer.

The current invention not only provides a simple multiple functions LED night light, but also provides excellent light performance. The LED night light have more than one functions, The preferred embodiment(s) can add any function selected from, by way of example, an adaptor or USB(s) or Outlet(s) or audio-plug or memory-card slot(s) device, motion or moving or radar or motion+ screen/display auto-comparison or other combination-sensors or others sensor device, PIR sensor device, air freshener, second LED function light device, bug repellent device, sonic repellent device, surge/short circuit/overheat/overload protection device, emergency/power fail with backup rechargeable or regular-battery light device, time device, timer device, wireless control or connection related device including IR/RF/ Remote control/blue-tooth/Z-way/Zig-Bee/Wifi/download APP software/internet/3 or 4 or 5G network, or any combination so the LED night light can be have nice light performance with more than single functions.

BRIEF DRAWINGS

FIGS. 1-4 are perspective views taken from different viewing angles showing a first preferred embodiment of a multiple function of LED night light.

FIG. 5 is a partially cut-away front view showing construction details of the preferred embodiment illustrated in FIGS. 1-4.

FIGS. 6-10 are perspective views at different viewing angles of a second preferred embodiment of a multiple function LED night light.

DETAILED DESCRIPTION

Figure 11:
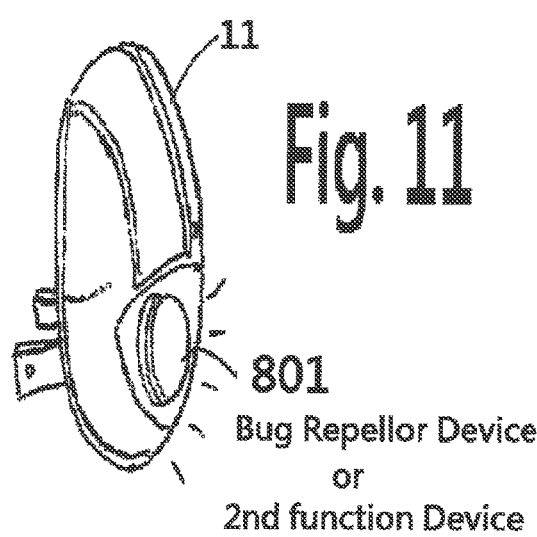
FIG. 11 is a perspective view of third preferred embodiment of a multiple function of LED lite.

FIG. 1 shows a first preferred embodiment of a multiple functions LED night light (1) in which the one of preferred added function is adaptor/outlet device (20) with ground-pole. The added function(s) (20) may alternatively be selected from the devices described in FIG. 11 shown bug-repelled (801) or-and the $2^{nd}$ electric device (803) or-and co-pending U.S. patent application Ser. Nos. 11/527, 631; 11/527,629; 11/498,881; 11/498,874; and 11/527,628 etc., such as an (i) air freshener, fragrance refill piece, liquid or wax fragrance or de-order piece as [FIG. 3 (24)]
(ii) adaptor/USB-port(s)/Outlet(s)/Audio receiving port(s)/memory receiving slot(s) device as [FIG. 1 (20), FIG. 2 (20a)(22b)(22c), FIG. 7 (7M), FIG. 8 (8h) (8i), FIG. 9 (9d,9e,9f), FIG. 10 (10d) (10e)],
(iii) sonic repelled/mouse repelled/mosquito high-voltage shock or terminator device,
(iv) frequency/wireless transmitting and/or receiving/ blue-tooth/Z-way/ZigBee/IR/RF remote control/wife/ router/APP download software/internet/3.4.5G network device [FIG. 7 (7h) (7i)],
(v) bug repelled device [FIG. 7 (6K)],
(vi) Second or power fail or emergency light or other 2nd light device as [FIG. 5 LEDs (60) (70), FIG. 4 LED (01), FIG. 9 power fail/emergency LED light source (9i) (9j)],
(vii) USB port for input power for internal battery or for output for charging other be-charge device with Micro-USB, Type A, Type C or preferred USB ports [FIG. 2 (22a)(22b)],
(viii) electric message device as [FIG. 7 (7h) (7i) for wireless transmitter and/or receiver],
(ix) timer/temperature/timepiece/device [FIG. 10 (10e)],
(x) power-bank having USB port and rechargeable battery device [FIG. 7 (7e) (7M)],
(xi) surge protection device[FIG. 10 (10f), FIG. 7 (6g)],
(xii) electric short circuit protection device[FIG. 10 (10f), FIG. 7 (6g)],
(xiii) base device for installation on an existing lamp socket as [FIG. 13 (13') or FIG. 13A (13")],
(xiv) emergency/power fail light device as [FIG. 9 (9K) (9i) (9j) (9h)] [FIG. 6 (6j)], or
(xv) wire-arrangement for LED night light have USB-port as [FIG. 3 (23), FIG. 8 (8j) slot, groove, ditch]
(xvi) Audio/sound/music device by pre-record or memory-units or blue-tooth or wifi connection as [FIG. 3 (24)]
(xvii) a camera and/or a wireless communication device the data storage device is a memory unit, SD card, micro SD card, to enable a photo, video, or sound to be saved into the data storage device and/or wireless transmitted or communicated to another electric device as [FIG. 7 (7N)];

to keep people comfortable or safe. The added function(s) may be one to N (any number) to make a very practical multiple functions LED night light.

As shown in FIG. 1, the multiple function LED night light (1) has a back housing (10) assembled with a front housing and arranged to capture prong (30) (30') (31) within and enable delivery of electricity from the outlet AC power source through the one of the preferred adaptors is outlet-device (20) to supply AC current the other electric appliance device (not shown). One of preferred embodiment for an optics-lens (40) exhibits light effects from the inner two-ends LED or LEDs (not shown) to provide a light performance having predetermined functions, time, duration and so forth as required.

From FIG. 1 the said LED(s) is get power from AC outlet and go through the inner AC-to-DC circuit and switch (28), motion sensor (28), photo sensor (28), or desired switch and sensor combination (s) (28) to control the LEDs for desired light functions.

From FIGS. 2, 3, 4 show the multiple function LED night light of FIG. 1 from different viewing angles.

From FIG. 2 show the LED night light (2) have built in LEDs for desire illumination. The night light (2) have built-in additional-functions preferred including the outlet-device (20*a*) which can be a rotatable construction, USB charging or receiving port(s) select from type A (22*a*) or type C (22*b*) or other preferred or alternative type such as micro-USB or other market available type for charge external be-charged products while the LED night light is plug-into or un-plug from AC outlet to perform the (a) USB charger and/or (b) Power bank functions basing on the LED night light is plug-into or un-plug from outlet power-source. From FIG. 3 show embodiment have preferred additional-functions not only for LED night light illumination but also preferred having audio (24), air-freshener (25), wire arrangement construction (23) to allow USB-wire device wire can be well coiled or rolled within the gap (23), glove (23), ditch (23), pole (not shown), bar (not shown), holder (not shown), foldable rack (not shown) but it shown on co-pending file case U.S. application Ser. No. 14/817,615 (FIG. M) filed on Aug. 4, 2015 and is CIP of U.S. application Ser. No. 13/910,295 filed on Jun. 5, 2013 now is U.S. Pat. No. 9,732,921 issue on Aug. 15, 2017.

From FIG. 4 show embodiment have preferred additional-functions not only for LED night light illumination but also preferred having rechargeable or non-rechargeable battery (26) for backup power source while the AC power-source shut-down. The said backup battery (26) that supply the power for LED(s) while AC power failed or night-light un-plug on outlet. The said while AC power is stop, the inner circuit will change power-source from AC to back-up battery (26) and supply the power to the said LED (01) on base of the LED night-light or-and power-fail LED(s) as FIG. 9 (9*i*) (9*j*) on top of the LED night-light housing. The Wire (1*w*) (1*w*) get AC power from AC power source to get into circuit (50*a*) and circuit have wire or PCB traces (3*w*) (4*w*) to connect with LEDs (01), and circuit have wire (5*w*) (6*w*) to connect with the backup battery (26). The circuit (50*a*) has pre-determined design for AC-to-DC to get DC power for DC electric-parts operation and also have pre-determined power-fail circuit to change AC current to battery DC current while AC power is terminated.

FIG. 5 shows details of one of the preferred embodiment FIG. 1 the inner construction of the multiple function LED night light (5) which has a back housing (100) and which holds an optic-lens or optics medium (400) having a ring design which is adjacent a circuit board (50) that connected to prong (300) (300') to deliver input home electricity to circuit-board (50) and the LEDs (60) (70) and cause the LEDs (60) (70) to emit a light beam into the optic-lens (60') (70') or optics medium (400) from the two input ends and. The preferred ring optics-lens or preferred optic-medium (400) has input ends are "U" shaped so as to allow as many of the light beams emitted from the LEDs (60) (70) to enter the optic-lens (60') (70') or optics medium (400) as possible. Some alternative or replaceable applications may have other designs for the optic-lens or optics medium (400) and input ends, which is not a limitation for the current invention's preferred embodiment description.

The input ends design can be any type which is still within the current invention scope. The prong is a grounded type (310) to provide more safety for the adaptor device. This prong arrangement can be varied including without ground-pin (310) or foldable-prongs depending on the different requirements of safety authorities or governments.

The optic-lens or optics medium (400) and of FIG. 5 may have different arrangements that 1. optics-medium (400) having sand-blasting to make the surface very rough and allow all the light to travel within without excess leakage or diffusion effects, or 2. optics-medium (400) having a plurality of the air-bubbles (or equivalent reflectors) inside the tube-like optic-lens or optics medium, or 3. optics-medium (400) is flat with curvature big-piece with opaque or milky or white color to make even brightness of illumination.

The said optics-medium (400) cause light beams from the LEDs to exit the desire geometric-shape optic-lens or optics-medium (400) big-surface not the ends and make whole piece or big-surface of optics-lens or-and optics-medium (400) with splendid even brightness or plurality of reflected light-beam or lighted-sports showing along the whole surface or the linear or length of the medium as FIG. 1 to FIG. 5 for linear-tube illumination with or without reflected brighter-sports or FIG. 6 to FIG. 10 for big-area even brightness illumination.

As shown in FIG. 5), the circuit (50) may incorporate desired electric components selected from the group including, alone or in combination, at least one resistor, capacitor, switch, sensor, diode, inductor, transformer, integrated circuit (hereafter as IC), AC-to-DC circuit (50), surge protector circuit (10*f*), USB charging or be-charging circuit (22*a*) (22*b*) (8*h*) (8*i*) (10*e*), power-failed circuit (9*h*) (9*i*) (9*j*) (9*k*), emergency light circuit (9*h*) (9*i*) (9*j*) (9*k*), wireless transmitting and/or receiving circuit (7*h*) (7*i*), audio-circuit (24), sonic repelled circuit (6*i*), air/fragrance/humility/liquid/moisture diffusor circuit (25), power bank with rechargeable batteries and USB ports (7*k*) (7M) (7*e*), time/temperature/timer circuit (10*e*), motion/photo/moving/radar detector or sensor (28) (6*i*) (7*j*) (9*g*) or sensor+ screen comparison-system, mobile device screen (not shown), or any available components suitable for electrically driving LED(s) to have predetermined functions, duration, time, effects, and/or brightness.

The appropriate conductive-piece(s) used for the electric connection to the prong (300) (300') (310) and LEDs (60) (70). The said conductive-piece(s) can be obtained from the marketplace and may include electric wires, and/or a wire-harness, cable, spring, metal piece, or other conductive-piece(s) without departing from the scope of the invention, as long as an electric signal can be delivered from the circuit (50) to the prong and LEDs.

FIGS. 6-10 show the same features as FIGS. 1-5, the only difference being the different housing and optic-lens design with different space to arrange the LEDs, prong, circuit, and additional-functions device(s) on the LED night light.

From FIG. 6, The said LED light has base (6*a*) has AC-to-DC circuitry inside to change AC current from outlet into desired DC current for inner LED or LED(s) light source(s) to turn-on and turn-off with desired functions. The LED or LED(s) light-beam emit to the $1^{st}$ preferred optic-lens or optics-medium (6*d*) (6*c*) which each has same or different treatment(s) to make the narrow emit-angle LED or LED(s) light beam to spread out to whole or big-size surface of the said optics-lens (6d) or optics-medium (6c) and the different with optics-lens (400) at the shape and inner and optics-arrangement or construction. The said FIG. 5 is solid and circle or donut or arc shape and is solid-piece without any hollow-inside or space-inside to add parts inside. Or the tube like circle or donut or arc shape having empty space to fill up the reflected-piece. And optic-lens (400) emit light from whole body or length to let people see the illumination for big-area(s) not the ends.

The optics-lens (6c) and (6d) same as the FIG. 6 to FIG. 10, the lens surface has desired treatment including sand-blaster or prism or other textures or marking or opaque-lens or painting white color; to make the narrow emit-out LED light beams to passing through and make a whole optics-lens or big-area for desire or preferred one of even brightness illumination.

This is not same as co-inventor US patent Prior arts "U.S. Pat. No. 7,632,004 issued date on Dec. 15, 2009 which is U.S. application Ser. No. 11/806,284 filed on May 31, 2007 Publication Ser. No. 2008/0304 289 Publication date on Dec. 11, 2008 for (#Q-07) LED night light with more than one optics means" to have ends glow or had tube on top with extra-piece to make the light-beam to be seem on whole surface of the optics-lens (400) or (6c) (6d).

From the FIG. 6 optics-lens (6c) or (6d) is not a solid circle or tube or arc or donut piece and it is a slim-piece to save plastic-expensive cost but can spread-out LED light-beam to whole or big-size surface.

From FIG. 6 can see LED narrow emit-out light beam through the optics-lens (6c) (6d) spread out to wider areas as FIG. 7 (7b).

From FIG. 6 show the LED night light (6) have the LEDs fit within the lower position to make the LED light-beam emit to walls of the inner space and make multiple reflection and/or refraction to make even brightness illumination with color-changing, color-selection, functions change from motion or without motion with preferred motion and photo sensor to trigger the LED(s) for desired illumination. Further, the said LED night light have the built-in additional functions including above said motion and photo sensor, but also have built-in rechargeable battery and USB-ports (not shown) for power failed time to turn on the top power fail light (6i) located on the top of housing (6e) which is separated with night light illumination areas (6c) (6d). The said LED night light also have optional or preferred more additional-functions as other sensor such as sound/moving/radar (microwave) sensor (6i), sonic repellent device to bug, mouse, or mosquito-high-voltage-terminator device (6k), surge/over-heat/over-load/over-charge/short-circuit protector circuit (6g), recharge battery (6h) for power failed time power source, or battery (6h) for power bank for built-in USB-export-port (not shown).

From FIG. 7 show the LED night light have built-in AC-to-DC circuit to get AC power-source to change to DC current for inside LED(s) to offer the desired functions for big-area illumination (7b). And, The LED night light have preferred additional-functions including the (1) wireless receiver and/or transmitter device (7h) (7i) including IR/RF/Blue-tooth/Z-way/Zig-Bee/Wifi to work with download APP software for desired wireless control, communication, operation, (2) USB-charging or be-charge port(s) in Type A, Type C, Micro-USB or other types available from market place with rechargeable or regular Alkaline battery, (3) sensors including CDS or PIR motion sensor or other preferred sensor or selected-switch or slide-switch with multiple-sections for selection purpose (7j) in one LED night light.

From FIG. 8 show the optics-lens (8g) is one of even-thickness for substrate and has preferred textures or marking or optics-designs (not shown but same FIG. 5 optics-lens (400) has sand-blaster treatment) on the one or two surface of the optics-lens (8f)(8e) substrates (8g).

The said LED night light (8) has preferred at least one additional-function such as (1) wire-arrangement glove, ditch, holder, racket, poles, stands (8i), (2) USB charging or input ports(s) (8h) (8i) for desired type including Type A, B, C, D or micro-USB ports for (2-1) charging outside be-charged products or (2-2) charging built-in rechargeable battery while the prong plug-in AC outlet power-source. The USB ports (8h) (8i) also can be an export-port to charge other products while the prong is un-plug so the LED night light became a Power-Bank to charge other be-charged products and power is from built-in rechargeable or regular alkaline battery with proper pre-designed charging circuit.

From the FIG. 9 show the Big area illumination (9a) which change from the narrow emit-out LED light beam passing through the front the optics-lens (9a) or-and (9b) or-and (9c) to become wider spread-out light-beam to make wider-area can see the illumination. Hereof, the said optics-lens can be any geometric shape, construction, size, thickness and treatment for optics-properties to get desired even brightness with color changing, color selection, function selection with preferred adjustable color or brightness or both.

The said added function or-and $2^{nd}$ electric-functions can like the ports (9d) (9e) is outlet device or USB-ports (not shown). The said outlet-device is one of 3 prongs outlets to allow other electric-device 3 male-prongs to insert as FIG. 1 to FIG. 5 shown or without ground-pin or is a foldable prong-device. The said outlet ports (9d) (9e) or USB ports (not shown) or other adaptor-hole (such as audio-input port) also can be any other $2^{nd}$ functions circuit or ports or receiving-end or slots as above discussed (i) to (xv) 15 preferred type of the $2^{nd}$ electric additional-functions.

From FIG. 10 show the preferred embodiment (10) LED night light has optic-lens (10a) (10b) (10c) which has desired texture or optics-design to make desired-areas has illumination from inner LED or LED(s) in any type and combination with desired circuitry to make desired light-show. The LED night light (100 have preferable additional-functions may select from;

10-1. Time/temperature/timer/weather display (10e), or

10-2. Surge/over-charge/over-heat/short-circuit/other protective circuit or device (10f)

10-3. USB ports for charging other outside be-charged products or charge built-in rechargeable battery and USB-ports is one of Type A, C or micro-USB or other type of USB-port (10e).

10-4. Outlet device (10d)

FIG. 11 shows a multiple function LED night light (11), in which the additional-function (801) can be selected from the group including any as above and below discussed (i) to (xv) 15 examples for the $2^{nd}$ additional-functions list but not limited for these 15 examples of $2^{nd}$ or more functions, or-and; as disclosed in co-pending U.S. patent application Ser. Nos. 1/527,631; 11/527,629; 11/498,881; 11/498,874; and Ser. No. 11/527,628 etc., of an air freshener, adaptor device, sonic device, frequency device, bug repelled device, second light device, timepiece, electric message device, timer device, temperature device, surge protection device, electric short circuit protection device, base device for installation on an existing lamp socket, emergency light device, or any other electric device(s) suitable for home use to keep people comfortable or safe.

Figure 12:
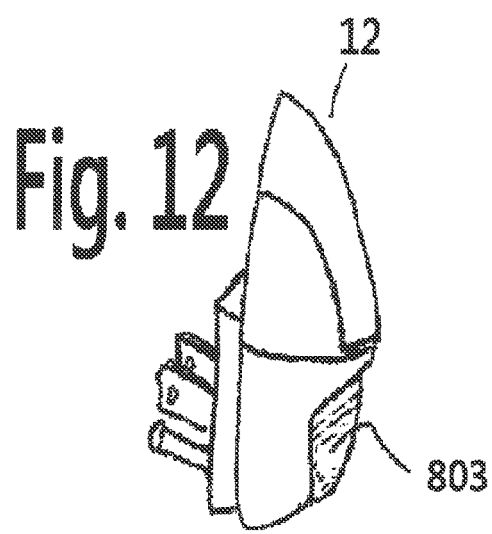
FIG. 12 is a perspective view of a fourth preferred embodiment of a multiple function LED night light.

From FIG. 12 also shows a multiple function LED night light (12) whose added functions is one bug or mosquito high-voltage device which having proper high-voltage multiple-level nets (803) on surface and the terminator will burn the bug or flier or bad-flying-bug while touch the multiple-level net (803).

Figure 13:
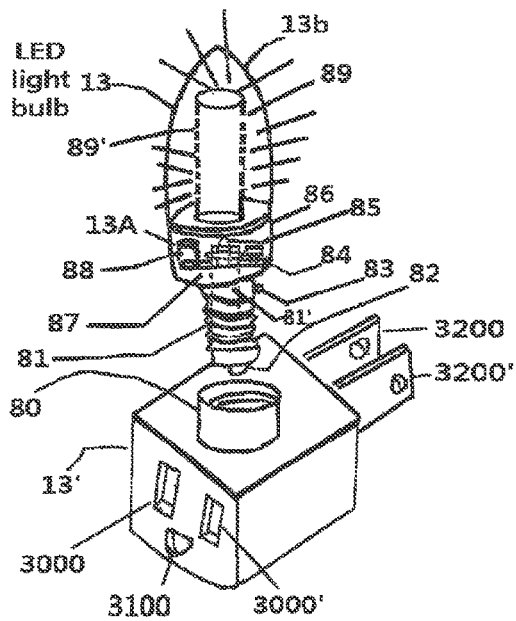
FIGS. 13 and 13A are perspective views of a fifth preferred embodiment of a multiple function of LED Bulb incorporate with a base device which connect by wire or by prong-base for installation on an existing lamp socket.

From FIG. 13 shows a multiple function LED night light is a special LED bulb (13) is assembled in the existing or out-of-date incandescent-bulb night light base (13') for additional-function. The multiple function LED night light of FIG. 13 has at least one LED-bulb (13) is built-in or add-on to installed on a geometric base that already have different type for mechanical toggle or electric photo-sensor as switch to turn on and turn off the light source.

The LED night-light has a bulb receiving-socket (80) to accept the conventional bulb base (81), which may selected from a screw type (81), pin type (not shown), rivet type (not shown), or knob type (not shown). The LED-bulb (13) has built-in circuit to change the original LED-light prong input-end AC electric signal to an LED's DC electric current while the LED bulb base (81) assembled with receiving-socket (80). The, the LED bulb (13) turn-on the LED(s) to exhibit predetermined function, duration, time, and/or brightness and light effects.

As shown in FIG. 13, the LED night-light base (13') has a female bulb socket (80). And, the said additional-function provided by the outlet-ports (3000) (3000') (3100) to offer electricity to other electric product(s) while the prong (3200) (3200') are plug-into the outlet power-source.

At the same time, while prong (3200) (3200') are connected with the wall outlet power source, the bulb socket (80) also will receive the wall outlet AC power source electric signal, which in the USA is around 110 Volt, 60 Hz to turn on the said built-in or added-on LED bulb.

On the other hand, specially designed LED bulb device (13) has a built-in circuit to change the wall outlet power source of 110V AC, 60 Hz to the working voltage and frequency of the circuit and LED(s) with desired control-kits such as a photo sensor, PIR sensor, manual switch, or other control available in the marketplace to turn on LED(s) according to pre-determined functions, brightness, duration, and time.

The LED bulb (13) fits into or built-into or assembled with the bulb socket (80). The LED bulb (13) has a screw-thread base (81) may be but is not limited to a screw type base as shown in FIG. 13. The bulb-base (81) has two electric terminals (83) and (82) to connect with LED night-light base (80) inner circuit electrodes (not shown) and through the electrodes to connected with a prong (3200) (3200').

The AC from the LED-Bulb (13) base outside two electric contactors (83) (82) supply LED-Bulb (13) inner circuit-board (81') and changes AC from home appliance electric current to LED working DC and turns on LEDs (85) for single color or multiple colors to provide a desired light performance. The LED (85) is located on circuit board (81') and connected with circuitry (81') and circuitry connect with the bulb-base electric-terminals (82) (83) by conventional conductive-piece in circuit board (81'). The electric components (88) (85) installed on the circuit board (81') or connected by conductive-piece (87) (84) away from the circuit board (81') because some components may be too big and unable to fit within the bulb base (81). The circuit board (81') is a narrow elongated board inserted into the bulb base (81), which is different with the prior art U.S. Pat. No. 6,227,679 (Zhang et al.) issued on May 8, 2001. The Zhang discloses a circuit board located on the top of the base, in a vertical relation to the circuit board and base. Also, in the arrangement of Zhang, the LEDs are not located on one side of the circuit board but rather are applied on the circuit board with a certain angle to the circuit board surface. This is because Zhang does not realize that the distance between the LED tip and the top cover is way too close and it is impossible to eliminate the spot-light problem of an LED light beam therefore cannot get a good light performance on the bulb surface. The current invention uses the invention described in one of the co-pending applications listed above, of an LED night light with more than one optics-lens, to make the spot-light beam into an area-light by first optics-lens. By adding a second optics-lens, the light beams brightness will be very close at every point on the desired area or surface.

As shown in FIG. 13, LED (85) on is situated on the edge of the circuit board (81') and positioned such that light beams from the LED are input to the first optics-lens (89) to cause the light beams to travel within the first optics-lens (89). The top may use a dome shape design or a "V" shape design to collect light beams that hit the top area of the first optics-lens. It will be appreciated that all equivalent treatments such as metallization of the top area or adding reflective arrangements within the first optics medium will be still fall within the scope of the invention. The LED device (13*b*) with screw type base can fit into a bulb night light's base socket (80) to replace the bulb and let the existing bulb night light become an LED night light without having to purchase a brand new unit to save money and change the big power consumption device into a lower power consumption device in seconds.

This arrangement solves the problem with the arrangement disclosed in the Zhang patent cited above that there is not enough space in a night light having the most popular dimensions to achieve a good area lighting effect. The most popular night light length is around 88 mm+/−50 mm (with base). The lens height is around 60 mm+/−30 mm (without base). The distance from the wall outlet cover to the highest point of the night light edge is around 35 mm+/−15 mm (from outlet cover surface). If placed in the same location as the existing bulb night light, the distance from the bulb socket to the wall outlet surface will be less than 35 mm. This distance from the wall to outside of the lens will only be less than 35 mm+/−15 mm. It is too short to change the spot-light effect of the LEDs into a surface or area lighting effect. Hereof, The Multiple functions LED night light have LED illumination function and also have at least one of below list additional-functions including:

(xviii) air freshener, fragrance refill piece, liquid or wax fragrance or de-order piece as [FIG. 3 (24)]

Figure 13A:
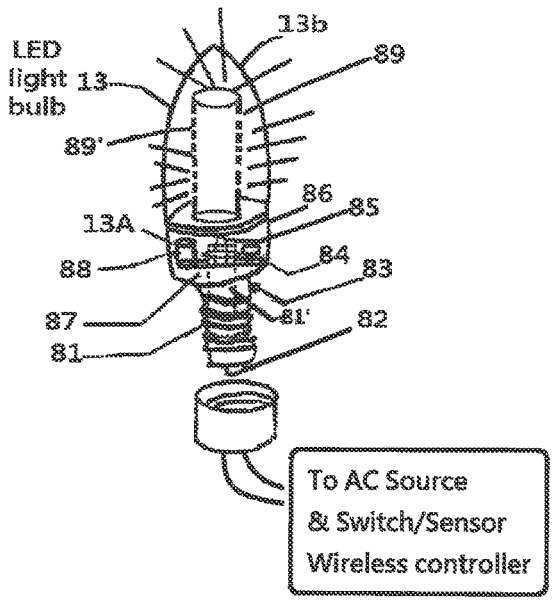

(xix) adaptor/USB-port(s)/Outlet(s)/Audio receiving port(s)/memory receiving slot(s) device as [FIG. 1 (20), FIG. 2 (20*a*)(22*b*)(22*c*), FIG. 7 (7M), FIG. 8 (8*h*) (8*i*), FIG. 9 (9*d*, 9*e*, 9*f*), FIG. 10 (10*d*) (10*e*)], (xx) sonic repelled/mouse repelled/mosquito high-voltage shock or terminator device, (xxi) frequency/wireless transmitting and/or receiving/blue-tooth/Z-way/ZigBee/IR/RF remote control/wife/router/APP download software/internet/3.4.5G network device [FIG. 7 (7*h*) (7*i*)], (xxii) bug repelled device [FIG. 7 (6K)], (xxiii) Second or power fail or emergency light or other 2nd light device as [FIG. 5 LEDs (60) (70), FIG. 4 LED (01), FIG. 9 power fail/emergency LED light source (9*i*) (9*j*)],
(xxiv) USB port for input power for internal battery or for output for charging other be-charge device with Micro-USB, Type A, Type C or preferred USB ports [FIG. 2 (22*a*)(22*b*)],
(xxv) electric message device as [FIG. 7 (7*h*) (7*i*) for wireless transmitter and/or receiver],
(xxvi) timer/temperature/timepiece/device [FIG. 10 (10*e*)],
(xxvii) power-bank having USB port and rechargeable battery device [FIG. 7 (7*e*) (7M)],
(xxviii) surge protection device[FIG. 10 (10*f*), FIG. 7 (6*g*)],
(xxix) electric short circuit protection device[FIG. 10 (10*f*), FIG. 7 (6*g*)],
(xxx) base device for installation on an existing lamp socket as [FIG. 13 (13') or FIG. 13A (13")],
(xxxi) emergency/power fail light device as [FIG. 9 (9K) (9*i*) (9*j*) (9*h*)] [FIG. 6 (6*j*)], or
(xxxii) wire-arrangement for LED night light have USB-port as [FIG. 3 (23), FIG. 8 (8*j*) slot, groove, ditch]

From above discussed and mentioned of preferred embodiments to show the scope of the current invention, it is appreciated that any alternative or equivalent functions of design still within the scope of the invention but not limited to all above discussion and mentioned details. The alternative or equivalent arrangement, process, installation or the like design, changes from the current invention still fall within the scope of the current invention.

The invention claimed is:

1. A multiple function LED night light, comprising:
a lower prong base;
a first optics lens having a flat or dome structure and built in a top of the lower prong base; and
a second optics lens that lacks a rear housing or back wall,
at least one LED configured to emit light beams that pass through the first optics lens and are emitted to the second optics lens,
wherein the lower prong base has built in (1) an AC-to-DC circuit, (2) the at least one LED, (3) a photo sensor or manual switch, and (4) a circuit for controlling the at least one LED to provide surface or area light illumination shown on (1) a front surface of the night light and not on a side wall, and (2) a home wall where the night light is plugged into an electrical outlet.

2. A multiple function LED night light as claimed in claim 1, further including at least one built-in added function other than single color illumination.

3. A multiple function LED night light as claimed in claim 1, wherein the LED night light circuit includes a trigger system that includes at least one of a motion sensor, the photo sensor, and a power fail detecting circuit.

4. A multiple function LED night light as claimed in claim 1, wherein the LED night light has at least one added function that is a function of a device that delivers, transmits, or receives at least one of a wired, infrared, radio frequency, and wireless electric signal.

5. A multiple function LED night light as claimed in claim 1, wherein the LED night light has at least one added function that is a function of a device which performs at least one of an audio, video, and/or digital data display while connected to an integrated circuit, memory kit, or at least one wireless signal source.

6. A multiple function LED night light as claimed in claim 1, wherein the LED night light includes at least one built-in electrical outlet.

7. A multiple function LED night light as claimed in claim 1, wherein the LED night light has at least one added function that is a function of a power bank that further includes at least one of an output and input power USB port having at least one of a Type A or Type C USB port, a micro-USB port, and another adaptor port.

8. A multiple function LED night light as claimed in claim 1, wherein the LED night light has at least one added function that is a function of at least one of a camera, wireless communication device, and data storage device for at least one of (1) capturing and/or saving photos, video, or sound, and (2) wirelessly transmitting the photos, video, or sound to another electrical device.

9. A multiple function LED night light as claimed in claim 1, wherein the LED night light has at least one added function that is a function of at least one female receiving port for receiving a male connector or plug to input or output power or electrical signals.

10. A multiple function LED night light as claimed in claim 1, wherein the LED night light provides at least one lighting function or effect selected from at least one of:
(1) color changing,
(2) color selection,
(3) color mixing, and
(4) brightness adjustment;
for at least one of floor illumination, wall illumination, ceiling illumination, multiple direction illumination, and status indication.

11. A multiple function LED night light as claimed in claim 1, wherein the LED night light has at least one added function that is at least one odor related function selected from air freshener, fragrance dispensing, and deodorizing.

12. A multiple function LED night light as claimed in claim 1, wherein the LED night light has at least one added function that performs power or electric signal delivery or digital data storage by at least one of an adaptor, USB port, outlet, audio receiving port, wireless power transmitting system, and memory receiving slot device.

13. A multiple function LED night light as claimed in claim 1, wherein the LED night light has at least one added function that includes a pest repellant function.

14. A multiple function LED night light as claimed in claim 1, wherein the LED night light has at least one added function that performs charging or supplies power by:
(1) at least one built-in or wired USB unit for charging or supplying power, and/or
(2) a wireless charging or power receiving system;
having at least one power input or output circuit.

15. A multiple function LED night light as claimed in claim 1, wherein the LED night light has at least one added function is wireless transmission or signal delivery by at least one of: (1) a wireless digital data, power transmitting, and/or receiving system, (2) a signal transmitting device, and (3) a signal receiving device.

16. A multiple function LED night light as claimed in claim 1, wherein the LED night light has at least one added function that is at least one of (a) power fail illumination by at least one second LED that emits a power fail or emergency light beam from a location different than a surface or indicator light source location, and (b) color changing, selection, mixing, or brightness adjustment by circuitry that controls at least one first LED having different or multiple colors.

17. A multiple function LED night light as claimed in claim 1, wherein the LED night light has at least one added function that is power delivery by at least one female input and/or output power USB port.

18. A multiple function LED night light as claimed in claim 1, wherein the LED night light has at least one added function that is at least one of color changing, color selection, color mixing, and brightness adjustment for an area or indicator light that includes at least one of an integrated circuit, a sensor, a switch, different colored LEDs, and a multiple color LED.

19. A multiple function LED night light as claimed in claim 1, wherein the LED night light has at least one added function that is digital data display by at least one of an integrated circuit, an LCD display with an LED backlight, an LED display, and a digital data input for time, temperature, or weather.

20. A multiple function LED night light as claimed in claim 1, wherein the LED night light has at least one added function that is power distribution by a built-in circuit having at least one input or output USB port.

21. A multiple function LED night light as claimed in claim 1, wherein the LED night light has at least one built-in electrical power outlet and at least one added function that is at least one of surge protection, electrical short protection, overheat protection, and overload protection of the at least one electrical power outlet.

22. A multiple function LED night light as claimed in claim 1, wherein the LED night light has at least one added function that is wide angle illumination by an LED bulb or CFL bulb device having a male bulb base for installation on an existing lamp receiving socket or female bulb socket.

23. A multiple function LED night light as claimed in claim 1, wherein the LED night light has more than one illumination function selected from (1) emergency lighting, (2) power fail lighting, (3) a flashlight function, and (4) color selection, changing, mixing and/or brightness adjustment.

24. A multiple function LED night light as claimed in claim 1, wherein the LED night light has at least one added function that is a function of a wire arrangement device that includes at least one of a space, groove, ditch, holder, foldable bar, or hook around which at least one wire is coiled or wrapped.

25. A multiple function LED night light as claimed in claim 1, wherein the LED night light has at least one added function that includes output of at least one of sound and music when provided with audio digital data from a memory device or wireless connection.

26. A multiple function LED night light as claimed in claim 1, wherein the LED night light has at least one added function that is wireless transmission and reception of audio and/or video data captured or obtained by at least one of:
 (1) a camera,
 (2) a wireless communication device, and
 (3) a data storage device,
 wherein the data storage device includes at least one of a memory unit, SD card, micro SD card, and cloud storage system.

27. A multiple function LED night light, comprising:
 at least one LED light source including at least one of: (a) a plurality of colored LEDs, (b) at least one multiple color LED, and (c) a plurality of differently colored LEDs, wherein light beams emitted by the at least one light source pass through an inner first optic piece of the LED night light and then are emitted to a front or second optics lens and at least one inner surface to be reflected and refracted multiple times to create substantially even brightness illumination that is shown on the front or second optics lens;
 at least one AC-to-DC circuit connected with at least one prong for delivering electricity from an AC wall outlet power source to:
  at least one of a circuit, integrated circuit, and photo sensor or manual switch to operate the at least one LED light source to provide at least one of:
   (i) surface or area illumination without LED hot or bright spots, and
   (ii) status indication regarding position, charging status, surge status, or power status, according to a predetermined function, time, duration, color, and brightness.

28. A multiple function LED night light, comprising:
 at least one light source including at least one of: (a) a plurality of colored LEDs, (b) at least one multiple color LED, and (c) a plurality of differently colored LEDs, wherein light beams emitted by the at least one light source pass through an inner first optic piece of the LED night light and then are emitted to a front or second optics lens and at least one inner surface to be reflected and refracted multiple times to create substantially even brightness illumination that is shown on the front or second optics lens;
 at least one AC-to-DC circuit connected with at least one prong for delivering electricity from an AC wall outlet power source to:
  (A) at least one of a circuit, integrated circuit, and photo sensor or manual switch to operate the at least one LED light source to provide at least one of:
   (i) surface or area illumination without LED hot or bright spots, and/or
   (ii) status indication regarding position, charging status, surge status, or power status, according to a predetermined function, time, duration, color, and brightness, and
  (B) a USB charging system to charge at least one other product through at least one built-in USB port.

29. A multiple function LED night light as claimed in claim 1, wherein the LED night light has at least one added function that is a function of a USB charging circuit with USB ports.

\* \* \* \* \*